(12) United States Patent
Ishida et al.

(10) Patent No.: US 6,197,203 B1
(45) Date of Patent: Mar. 6, 2001

(54) FILTRATION METHOD AND FILTRATION APPARATUS

(75) Inventors: Hiroshi Ishida; Itsuo Uragami; Toshiaki Inaba, all of Tokyo (JP)

(73) Assignee: Chiyoda Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/256,551

(22) Filed: Feb. 24, 1999

(30) Foreign Application Priority Data

Apr. 8, 1998 (JP) .................................................. 10-096283

(51) Int. Cl.⁷ ...................................................... C02F 1/32
(52) U.S. Cl. ............................. 210/748; 210/764; 210/805
(58) Field of Search ................................... 210/650, 748, 210/764, 805, 321.6, 321.69

(56) References Cited

U.S. PATENT DOCUMENTS 5,389,254 * 2/1995 Sherman ............................ 210/257.2
5,451,317 * 9/1995 Ishida et al. ......................... 210/332
5,614,088 * 3/1997 Nagai et al. ......................... 210/188
5,651,889 * 7/1997 Wataya et al. .................. 210/321.75

OTHER PUBLICATIONS

"Prevention Membrane–Fouling by USV Irradiation in Membrane Separation Process for Drinking Water Treatment", The Water Environment Society of Japan; vol. 18, No. 11 (1995) pp. 924–928.

* cited by examiner

Primary Examiner—David A. Simmons
Assistant Examiner—Betsey Morrison Hoey
(74) Attorney, Agent, or Firm—Heslin & Rothenberg, P.C.

(57) ABSTRACT

Filtration apparatus prevents a membrane filter from fouling by providing a UV irradiation apparatus. The filtration apparatus comprises a filtration tank which contains a membrane filter with a pore size of 0.1 to 1 μm connected to the UV irradiation equipment, an air diffusing pipe placed below the membrane filter, an air blower for sending air to the air diffusing pipe, a filtrate discharge pipe connected to the membrane filter, a flow meter and a flow control valve.

6 Claims, 3 Drawing Sheets

FILTRATION METHOD AND FILTRATION APPARATUS

BACKGROUND OF THE INVENTION

1. Field of the Invention

The present invention relates to a filtration method for water employing a membrane filter, and a filtration apparatus.

2. Description of the Prior Art

FIG. 3 is a perspective view showing the construction of a conventional filtration apparatus.

FIG. 4 is a schematic representation of a construction of different conventional filtration apparatus.

FIG. 3 and FIG. 4 show a filtration apparatus in which an ultramembrane filter, a micromembrane filter or a nonwoven fabric is disposed in a filtration tank into which air is blown. The growth of algae on the membrane surface results in a layer of material that makes membrane filtration impossible because of hydraulic resistance of the algae layer. This can occur within one to two weeks after a new membrane is placed in service for recirculation of pool water and fish breeding water, for drinking water from river water and for filtration of sewage treated with activated sludge.

As a countermeasure for fouling of the membrane filter as described above, sponge balls are usually placed in the filtration tank to remove the algae layer on the membrane filter. The sponge balls contact the filtration surface of the membrane facilitating peeling of the algae off the surface. However, this measure has a small removal effect along with having a drawback that the sponge balls are drained together with the sludge accumulated in the filtration tank, requiring a cost for supplementing the sponge balls. Otherwise, sodium hypochlorite is added into the filtration tank to prevent growth of algae or to disinfect algae. The effective chlorine concentration, then, should be maintained at a certain level, for example at 0.5 ppm, in this method. Chlorine residuals are toxic to aquatic life in receiving waters and the by-products of chlorinating may be carcinogenic. Moreover, growth of microorganisms for decomposing inactivated algae in the activated sludge is inhibited with added chlorine, thereby colloidal organic substances produced from incomplete decomposing of inactivated algae may foul of the membrane filter.

SUMMARY OF THE INVENTION

Accordingly, an object of the present invention is to solve the foregoing problems, thereby preventing a membrane filter from fouling.

The above object can be achieved by the following method and apparatus.

In one aspect, the present invention provides a filtration method in which process water is irradiated with UV light, and the UV irradiated process water is aerated and filtered.

In another aspect, the present invention provides a filtration apparatus comprising UV irradiation means for irradiating process water with UV light, filtration means with a membrane filter for filtrating the UV irradiated process water, and air diffusing means for blowing air below the membrane filter.

In yet another aspect, the present invention provides a filtration apparatus comprising UV irradiation means for irradiating process water with UV light, filtration means with a membrane filter for filtrating the UV irradiated process water, air diffusing means for blowing the air to the filtration means, and means disposed between the air diffusing means and membrane filter to generate circulating flow.

Pore size of the membrane filter is preferably in the range from 0.1 through 1 $\mu$m.

According to the construction described above, algae and spores in process water to be fed to the filtration tank are biologically inactivated by UV irradiation. The inactivated algae and spores are rejected with a membrane filter having a pore size of 0.1 to 1 $\mu$m and remain in the filtration tank. The inactivated algae and spores in the filtration tank are decomposed by microorganisms in the activated sludge, which microorganisms appear and inhabit the filtration tank with the benefit of blown air.

DESCRIPTION OF THE PREFERRED EMBODIMENT

An embodiment of the present invention will be described with reference to the drawings.

Figure 1:
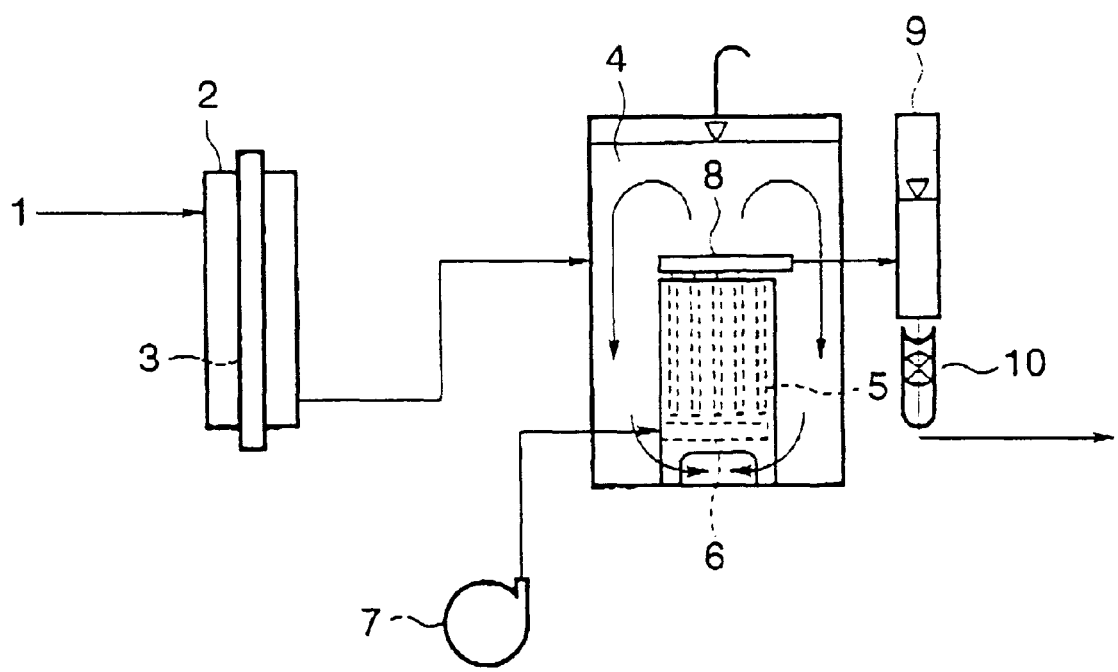
FIG. 1 is a schematic representation showing the construction according to one embodiment of the present invention.

FIG. 1 is a schematic representation showing the construction of one embodiment of the present invention. As shown in this drawing, a UV lamps 3, such as a UV sterilization lamps irradiating UV light with a wavelength of 254 nm, is provided in a UV irradiation apparatus 2. Flat or hollow fiber membrane filters 5 having a pore size of 0.1 to 1 $\mu$m are disposed in a filtration tank 4 having a sealed structure. An air diffusing pipe 6 is attached below the membrane filters 5 in the filtration tank 4 for sending air from an air blower 7 into the filtration tank 4. The membrane filters 5 are connected to a filtrate discharge pipe 8 and the filtrate discharge pipe 8 is connected to a flow meter 9 and a flow control valve 10.

Process water 1 containing algae and spores is fed into the UV irradiation apparatus 2, where the algae and spores are inactivated by a threshold level or more of UV irradiation due to photochemical damage of nucleic acids in their cells. When process water containing the inactivated algae and spores is fed into the filtration tank 4, these algae and spores have no activity as microorganisms that can adhere on the membrane filter 5. Since the sizes of the inactivated algae and spores are larger than the pore size of 0.1 to 1 $\mu$m of the membrane filter 5, they can not pass through the membrane filter 5 but float in the filtration tank 4. Meanwhile, microorganisms appear and inhabit the activated sludge in the filtration tank 4 with the benefit of blown air from an air flower 7. Even when the air contains different algae and spores, the concentration of them is so small as compared with the concentration of them is so small as compared with the concentration of microorganisms in the activated sludge that recessive strains of algae and spores can not survive in the filtration tank 4 against dominant microorganisms in the activated sludge. Since the activated sludge is not irradiated with UV light, the microorganisms in the activated sludge have activity as organism, feeding on the inactivated algae and spores to finally decompose them into carbon dioxide and water. The decomposition process resembles the activated sludge process of sewerage, wherein the inactivated algae and spores turn into minute colloidal substances as intermediates of the activated sludge process to be adsorbed on activated sludge flocks. The fine pore size of the membrane filter is desirable for performing filtration without fouling of the pore in the presence of colloidal substances. But a pore size as large as 0.1 to 1 $\mu$m, prevents fouling because the colloidal substances having a fine size are adsorbed on the coarse flocks of the activated sludge. Since the amount of the flocks increases with time, they are discharged from the filtration tank 4 when their concentration has reached 1 to 1.5%. Process water 1 filtrated with the membrane filter 5 is sent outside of the system as processed water via the filtrate discharge pipe 8, flow meter 9 and flow control valve 10. A gravitational filtration is possible in the present embodiment since the membrane filter 5 has a large pore size and resistance to filtration of the membrane filter 5 is small as compared with other filtration means.

An air diffusing pipe 6 is provided below the membrane filter 5 in the present embodiment because a gas-liquid multi-phase flow is formed by the aeration to clean the surface of the membrane filter 5, thereby preventing filter cake from forming on the membrane surface.

Figure 2:
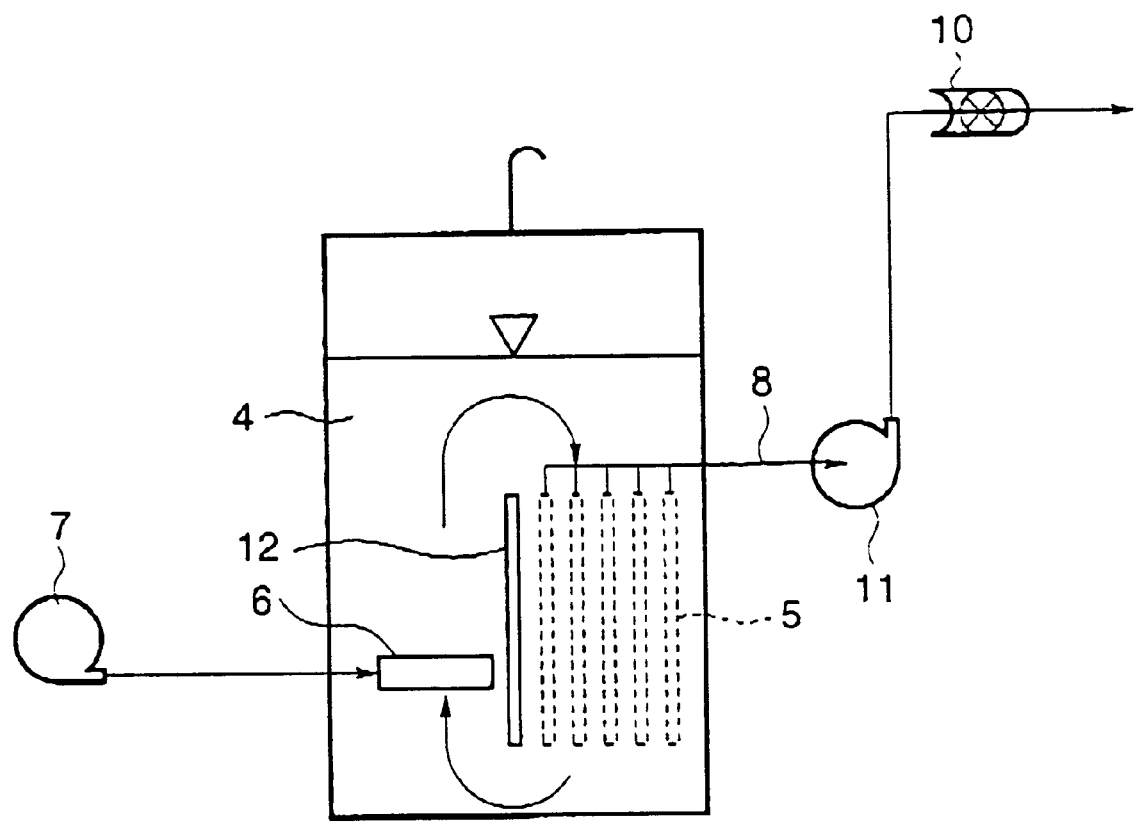
FIG. 2 is a schematic representation showing the construction of another embodiment of the present invention.
Figure 3:
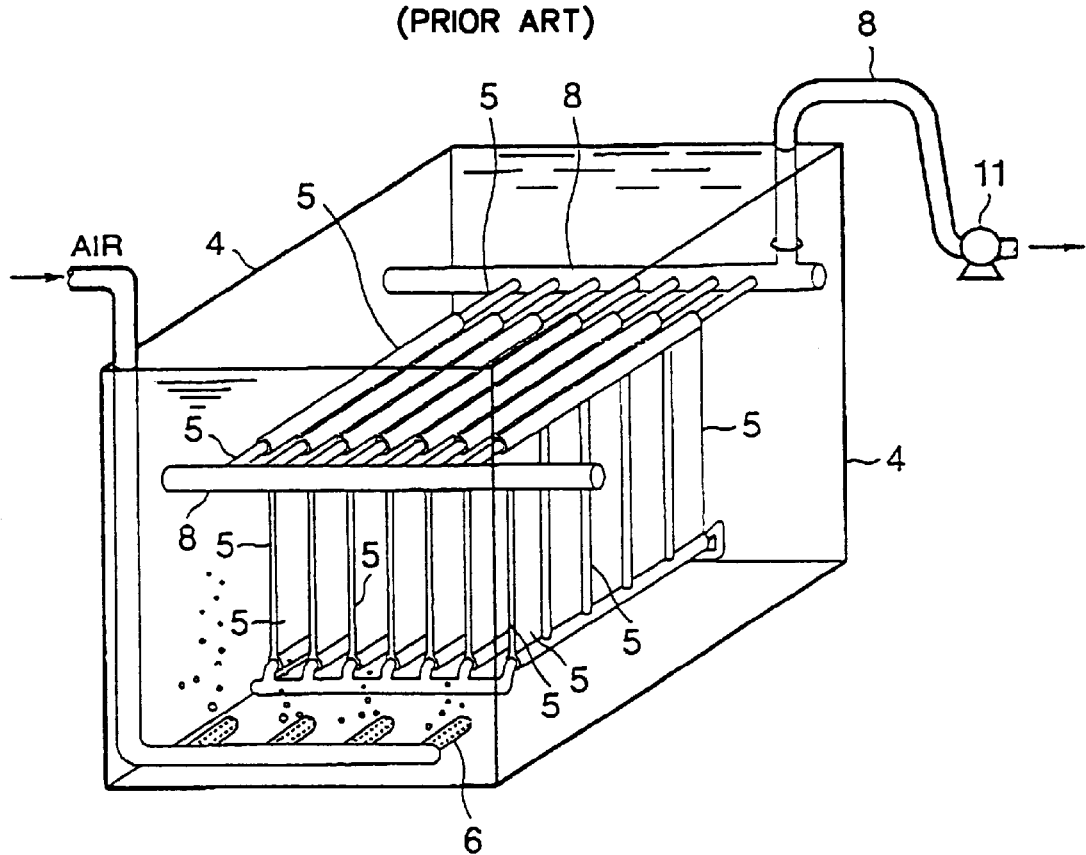
FIG. 3 is a schematic representation showing the construction of a conventional filtration apparatus.
Figure 4:
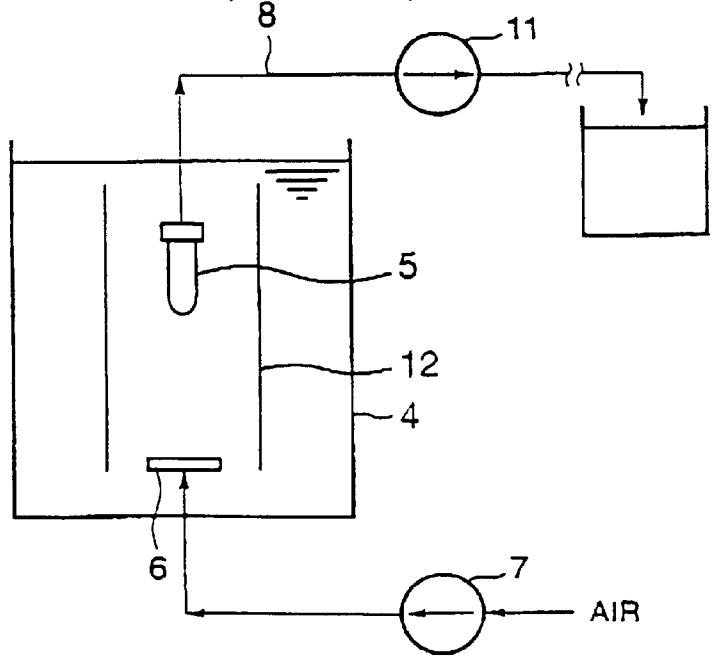
FIG. 4 is a perspective view showing the construction of another conventional filtration apparatus.

Another embodiment will be described hereinafter. FIG. 2 is a schematic representation showing the construction of another embodiment according to the present invention. Although the basic construction is the same as shown FIG. 1, the interior of the filtration tank 4 is divided into two approximately equal compartments by disposing a dividing wall 12 in the filtration tank 4. The air diffusing pipe 6 is attached at an empty compartment side where the membrane filter 5 is not installed while a suction pump 11 is provided for sucking filtrated water from the membrane filter 5. Blowing air from the diffusing pipe 6 generates a circulation flow circulating along the clockwise direction in the filtration tank 4, which cleans the surface of the membrane filter 5. The dividing wall 12 is disposed in the filtration tank 4 so as to generate the circulating flow, thereby providing circulation flow generating means. Otherwise, the air diffusing pipe 6 may be placed directly under the membrane filter 5 to allow a counter-clockwise circulation flow to generate, thereby cleaning the surface of the membrane filter 5.

As mentioned above, physically inactivating the algae and spores and decomposing the inactivated algae and spores with microorganisms make it possible to prevent fouling of the membrane filter over a long period of time without adding or forming harmful chemical substances to thereby assure safety for people and aquatic life.

The present invention provides an effect for preventing the membrane filter from fouling over a long period of time by a process comprising physically inactivating the algae and spores followed by decomposing the inactivated algae and spores with microorganisms.

What is claimed is:

1. A method for diminishing fouling of a membrane filter disposed in a filtration tank into which air is blown, comprising:

physically inactivating algae and spores in process water;

introducing said process water having inactivated algae and spores into said filtration tank;

decomposing said inactivated algae and spores with microorganisms in said filtration tank; and aerating and filtrating said process water in the filtration tank, whereby fouling by the inactivated algae and spores of the membrane filter is inhibited.

2. The method of claim 1, wherein said physically inactivating comprises irradiating the process water with UV light; said decomposing is carried out by microorganisms that inhabit activated sludge in the filtration tank, and said aerating produces a gas-liquid multi-phase flow which cleans the surface of the membrane filter and provides air into said filtration tank for the microorganisms in the activated sludge.

3. The method of claim 2, wherein the activated sludge is not irradiated with UV light.

4. The method of claim 2 wherein, in said decomposing, the inactivated algae and spores are converted into minute colloidal intermediates and adsorbed on activated sludge flocks.

5. The method of claim 4, further comprising the step of discharging said activated sludge flocks from said tank when concentration of the flocks reaches 1 to 1.5%.

6. The method of claim 1 wherein said aerating and filtrating occur concurrently.

* * * * *